United States Patent
Johnsen et al.

(10) Patent No.: US 8,739,273 B2
(45) Date of Patent: *May 27, 2014

(54) SYSTEM AND METHOD FOR SUPPORTING SUBNET MANAGEMENT PACKET (SMP) FIREWALL RESTRICTIONS IN A MIDDLEWARE MACHINE ENVIRONMENT

(75) Inventors: Bjørn Dag Johnsen, Oslo (NO); Roy Arntsen, Oslo (NO); Lars Paul Huse, Oppegård (NO)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/545,796

(22) Filed: Jul. 10, 2012

(65) Prior Publication Data

US 2013/0019302 A1 Jan. 17, 2013

Related U.S. Application Data

(60) Provisional application No. 61/506,557, filed on Jul. 11, 2011, provisional application No. 61/645,517, filed on May 10, 2012.

(51) Int. Cl.
*H04L 29/06* (2006.01)
*G06F 21/00* (2013.01)

(52) U.S. Cl.
USPC .......................................................... 726/13

(58) Field of Classification Search
None
See application file for complete search history.

(56) References Cited

U.S. PATENT DOCUMENTS

| | | |
|---|---|---|
| 6,941,350 B1 | 9/2005 | Frazier |
| 6,981,025 B1 | 12/2005 | Frazier et al. |
| 7,113,995 B1 * | 9/2006 | Beukema et al. ............. 709/229 |
| 7,290,277 B1 | 10/2007 | Chou et al. |
| 7,721,324 B1 * | 5/2010 | Jackson ............................ 726/4 |
| 2004/0037279 A1 | 2/2004 | Zelig et al. |
| 2004/0123142 A1 | 6/2004 | Dubal et al. |
| 2007/0022479 A1 | 1/2007 | Sikdar et al. |
| 2008/0159277 A1 | 7/2008 | Vobbilisetty |
| 2011/0023108 A1 * | 1/2011 | Geldermann et al. .......... 726/13 |
| 2011/0131447 A1 * | 6/2011 | Prakash et al. .................. 714/19 |

FOREIGN PATENT DOCUMENTS

| | | |
|---|---|---|
| EP | 1 128 607 A2 | 8/2001 |
| EP | 2160068 A1 | 3/2010 |
| WO | 2012037518 | 3/2012 |

OTHER PUBLICATIONS

Lee, M. et al., "Security Enhancement in Infiniband Architecture," Proceedings of the 19th IEEE International Parallel and Distributed Processing Symposium, Denver, Colorado, Apr. 4-8, 2005, Piscataway, New Jersey, Apr. 4, 2005, 18 pages.

(Continued)

*Primary Examiner* — Gilberto Barron, Jr.
*Assistant Examiner* — Malcolm Cribbs
(74) *Attorney, Agent, or Firm* — Meyer IP Law Group

(57) ABSTRACT

A system and method can provide subnet management packet (SMP) firewall restrictions in a middleware machine environment. A secure firmware implementation can be provided on a host channel adaptor (HCA), wherein the HCA is associated with a host in the middleware machine environment. The secure firmware implementation operates to receive at least one SMP from the host or destined to the host, and prevent the host from sending or receiving the at least one SMP. Furthermore, the secure firmware implementation can include a proxy function that can communicate with external management components on behalf of the host.

16 Claims, 3 Drawing Sheets

(56) References Cited

OTHER PUBLICATIONS

Sun Infiniband Dual Port 4x QDR PCIe ExpressModule and Low Profile Host Channel Adapters M2, Frequently Asked Questions, Sep. 21, 2010, http://www.oracle.com/us/products/servers-storage/networking/infiniband/sun-qdr-ib-hcas-faq-172841.pdf, retrieved on Sep. 11, 2012, 4 pages.
International Search Report dated Sep. 23, 2013 for Application No. PCT/US2013/040639, 10 pages.
International Search Report dated Sep. 26, 2013 for Application No. PCT/US2013/040656, 10 pages.

* cited by examiner

SYSTEM AND METHOD FOR SUPPORTING SUBNET MANAGEMENT PACKET (SMP) FIREWALL RESTRICTIONS IN A MIDDLEWARE MACHINE ENVIRONMENT

CLAIM OF PRIORITY

This application claims priority to U.S. Provisional Patent Application No. 61/506,557, entitled "SYSTEM AND METHOD FOR USING UNICAST AND MULTICAST FLOODING MECHANISMS TO PROVIDE EoIB GATEWAY vNICs" filed Jul. 11, 2011, and U.S. Provisional Patent Application No. 61/645,517, entitled "SYSTEM AND METHOD FOR PROVIDING SECRET MANAGEMENT KEY IN A MIDDLEWARE MACHINE ENVIRONMENT" filed May 10, 2012, which applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

This application is related to the following patent application, which is hereby incorporated by reference in its entirety:
U.S. patent application Ser. No. 13/545,803, entitled "SYSTEM AND METHOD FOR PROVIDING SWITCH BASED SUBNET MANAGEMENT PACKET (SMP) TRAFFIC PROTECTION IN A MIDDLEWARE MACHINE ENVIRONMENT", by inventors Bjørn Dag Johnsen, David Brean and Ola Tørudbakken, filed Jul. 10, 2012.

FIELD OF INVENTION

The present invention is generally related to computer systems and software such as middleware, and is particularly related to supporting a middleware machine environment.

BACKGROUND

The interconnection network plays a beneficial role in the next generation of super computers, clusters, and data centers. High performance network technology, such as the InfiniBand (IB) technology, is replacing proprietary or low-performance solutions in the high performance computing domain, where high bandwidth and low latency are the key requirements. For example, IB installations are used in supercomputers such as Los Alamos National Laboratory's Roadrunner, Texas Advanced Computing Center's Ranger, and Forschungszentrum Juelich's JuRoPa.

IB was first standardized in October 2000 as a merge of two older technologies called Future I/O and Next Generation I/O. Due to its low latency, high bandwidth, and efficient utilization of host-side processing resources, it has been gaining acceptance within the High Performance Computing (HPC) community as a solution to build large and scalable computer clusters. The de facto system software for IB is OpenFabrics Enterprise Distribution (OFED), which is developed by dedicated professionals and maintained by the OpenFabrics Alliance. OFED is open source and is available for both GNU/Linux and Microsoft Windows.

SUMMARY

Described herein are systems and methods for providing subnet management packet (SMP) firewall restrictions in a middleware machine environment. A secure firmware implementation can be provided on a host channel adaptor (HCA), wherein the HCA is associated with a host in the middleware machine environment. The secure firmware implementation operates to receive at least one SMP from the host or destined to the host, and prevent the host from sending or receiving the at least one SMP. Furthermore, the secure firmware implementation can include a proxy function that can communicate with external management components on behalf of the host.

DETAILED DESCRIPTION

Described herein is a system and method for providing a middleware machine or similar platform. In accordance with an embodiment of the invention, the system comprises a combination of high performance hardware, e.g. 64-bit processor technology, high performance large memory, and redundant InfiniBand and Ethernet networking, together with an application server or middleware environment, such as WebLogic Suite, to provide a complete Java EE application server complex which includes a massively parallel in-memory grid, that can be provisioned quickly, and can scale on demand. In accordance with an embodiment, the system can be deployed as a full, half, or quarter rack, or other configuration, that provides an application server grid, storage area network, and InfiniBand (IB) network. The middleware machine software can provide application server, middleware and other functionality such as, for example, WebLogic Server, JRockit or Hotspot JVM, Oracle Linux or Solaris, and Oracle VM. In accordance with an embodiment, the system can include a plurality of compute nodes, IB switch gateway, and storage nodes or units, communicating with one another via an IB network. When implemented as a rack configuration, unused portions of the rack can be left empty or occupied by fillers.

In accordance with an embodiment of the invention, referred to herein as "Sun Oracle Exalogic" or "Exalogic", the system is an easy-to-deploy solution for hosting middleware or application server software, such as the Oracle Middleware SW suite, or Weblogic. As described herein, in accordance with an embodiment the system is a "grid in a box" that comprises one or more servers, storage units, an IB fabric for storage networking, and all the other components required to host a middleware application. Significant performance can be delivered for all types of middleware applications by leveraging a massively parallel grid architecture using, e.g. Real Application Clusters and Exalogic Open storage. The system delivers improved performance with linear I/O scalability, is simple to use and manage, and delivers mission-critical availability and reliability.

M_Key Protection Model

Figure 1:
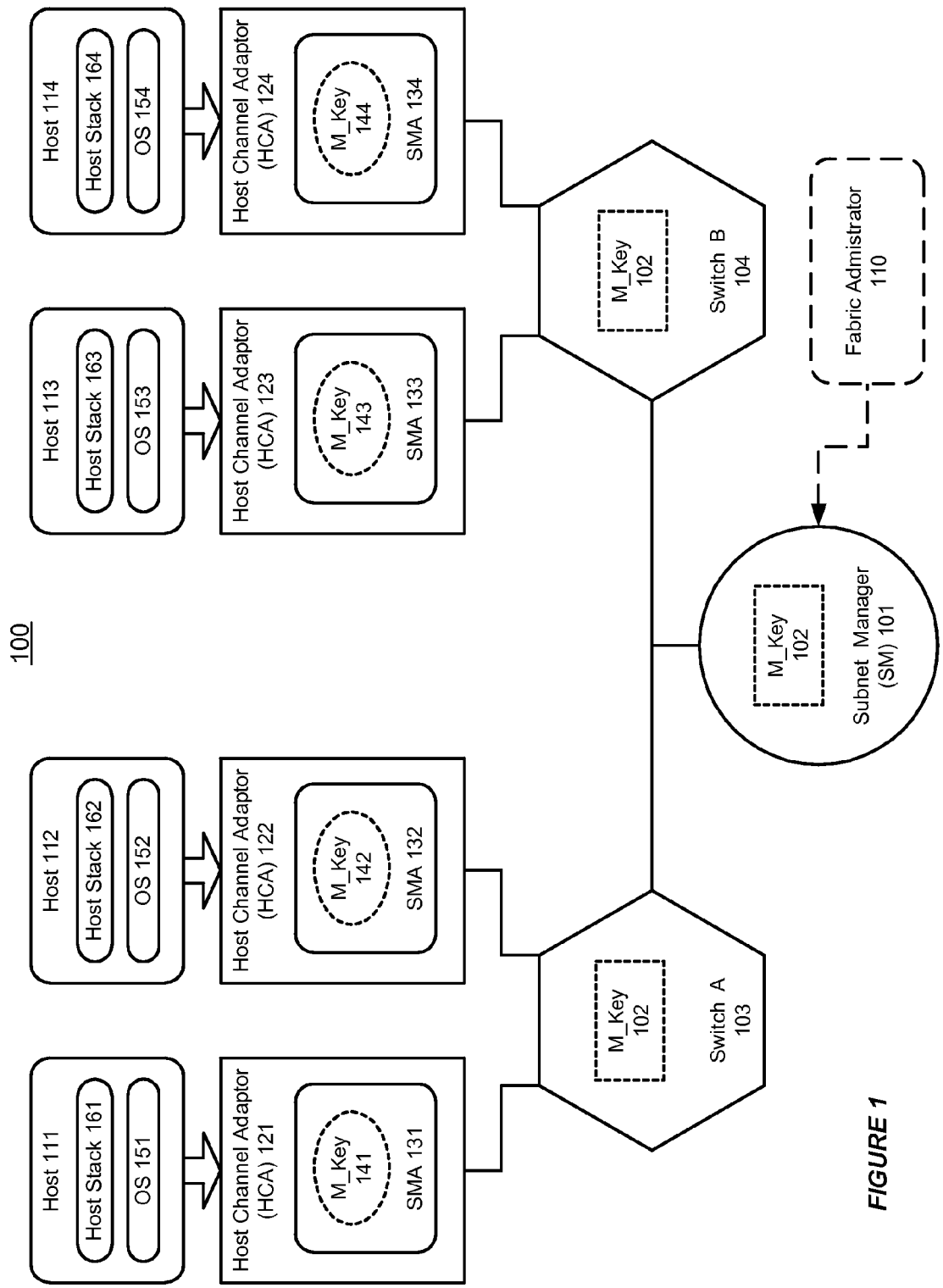
FIG. 1 shows an illustration of supporting a management key protection model in a middleware machine platform, in accordance with an embodiment of the invention.

FIG. 1 shows an illustration of supporting a management key protection model in a middleware machine platform, in accordance with an embodiment of the invention. As shown in FIG. 1, a management key, such as an M_Key 102, can be used to protect an IB fabric (or an IB subnet) 100. The values for the M_Key 102 may only be known by fabric administrators 110, which can have administrator access to the switches 103-104 and the designated subnet manager (SM) nodes 101 in the IB subnet/fabric 100. The integrity of the M_Key(s) 102 depends on the integrity of the fabric level administration passwords used by the fabric administrators 110, as well as the physical access protection of the switches 103-104 in the IB subnet/fabric 100, e.g. in a data center.

In the IB fabric 100, a secure HCA firmware implementation in HCA 121-124 can keep the type and identity of various fabric nodes well defined. Each of the HCA 121-124 can implement a subnet management agent (SMA) component 131-134, each of which can be associated with an M_Key 141-144. Furthermore, the connected switches A-B 103-104 can be controlled by the fabric administrator 110. Thus, any rogue SMA implementation 131-134 may not compromise the fabric administrator 110 defined M_Key 102 values that are used in the IB subnet/fabric 100.

Additional descriptions of various embodiments of using secure HCA firmware implementation in a middleware machine platform are provided in U.S. patent application Ser. No. 13/487,973, entitled "SYSTEM AND METHOD FOR PROVIDING SECURE SUBNET MANAGEMENT AGENT (SMA) IN AN INFINIBAND (IB) NETWORK", filed Jun. 4, 2012, which application is herein incorporated by reference.

Furthermore, the fabric administrator 110 can ensure that new M_Key values 102 for the IB subnet/fabric 100 are installed out-of-band on switches 103-104 (as well as for the relevant subnet manager instances 101). Additionally, the fabric administrator 110 can ensure that there is infinite M_Key 102 lease time on the switches 103-104. Thus, the host based software 161-164, e.g. a host based subnet manager on different hosts 111-114 (including an operating system 151-154), can not hijack the control of any switch 103-104 in the IB subnet/fabric 100.

In accordance with an embodiment of the invention, a single M_Key 102 value (or a single set of M_Key values) can be used for various nodes in the IB subnet/fabric 100 based on the IB specification defined access restrictions. The correct value for a current M_Key 102 may need to be specified before either reading or updating the M_Key 102, since the secure HCA firmware can ensure that the "read protected" M_Key assigned to the local HCA 121-124 is not exposed to local host based software.

Additionally, local software 161-164 on different hosts 111-114 may be able to hi-jack the HCA port by setting up its own M_Key value, in the case when the current M_Key value for HCA ports is defined at run-time. Also, the host local software 161-164 may make the HCA port un-manageable for the designated subnet manager 101, e.g., before the designated subnet manager 101 sets up any M_Key 102 for the HCA 121-124.

In accordance with an embodiment of the invention, a designated subnet manager 101 can ignore any HCA ports with un-known M_Key value and leave the corresponding link not initialized. The only impact of a hijacked HCA port M_Key can be that the HCA port may not be operational, and the designated subnet manager 101 can prevent host based software from communicating via this HCA port using normal communication, i.e. non-SMP/VL15 based communication.

Furthermore, when host software 111-114 compromises the local HCA M_Key value, the offending host software may be able to bring the HCA port to an operational state with activated local identifiers (LIDs) and partition membership. In such a case, if the switch port on a switch 103-104 that connects to the HCA 121-124 is controlled by a different M_Key value that is not known to the host software 111-114 that has compromised the local HCA M_Key value, then the offending host software 111-114 may not be able to bring the link to a full operational state that allows normal data traffic.

In accordance with an embodiment of the invention, the IB fabric 100 can prevent direct route SMPs between the various hosts 111-114 in order to avoid various potentially threatening scenarios. In one scenario, a host, e.g. host 111, can use the direct route SMPs to hijack the M_Key of the HCA port on a remote host, e.g. 112, after the remote host 112 and/or the remote HCA 122 are reset. This can cause the remote HCA 122 port to become inaccessible from the SM 101 and thereby prevent the remote host 112 from participating in normal IB communication, i.e. a denial of service (DoS) attack. In another scenario, when two hosts, e.g. host 111 and host 114, are compromised by hackers, the cooperating administration in the IB fabric 100 that depends on direct route SMPs may allow the two compromised hosts to exchange information using direct route SMPs.

The IB fabric 100 can support the cooperating administration for exchanging information between different hosts 111-114 without depending on direct route SMPs. For example, the administrators for the hosts can access a shared web-page on the Internet instead of relying on direct route SMPs in the IB fabric 100. From a fabric security perspective, leaving direct route SMPs as a security hole on the IB fabric may be considered a worse situation than allowing both host administrators to access a shared web-page on the Internet.

In accordance with an embodiment of the invention, the HCA ports may be set up with finite lease time on M_Keys 102, e.g. due to a high availability concern with the subnet manager(s) 101 that maintains the M_Key 102 lease period. Thus, the M_Keys 102 can expire without the associated link going down. Consequently, the state of the HCA 121-124, e.g. the partition membership, may be updated while links are still in active mode and the LID routes for the involved port are still operational. Then, the IB fabric 100 without M_Key protection may mistakenly allow normal IB traffic between a hi-jacked host and the hosts in other partitions.

Furthermore, if the M_Keys 102 expire before the links going down, both the local HCA, e.g. HCA 121, and any remote HCA, e.g. HCA 124, may be hi-jacked and the partition membership may be modified. If the associated switch ports, e.g. on switches 103-104, are not set up to perform partition enforcement, then the traffic with non-solicited partition membership can reach any other node in the fabric.

Additionally, a subnet manager 101 within the IB fabric 100 can depend on a designated virtual lane (VL), e.g. the VL15 buffering, in order to correctly monitor and control the IB fabric 100 and negotiate with other subnet managers in the IB fabric 100. Since the VL15 buffering within the IB fabric 100 is a shared resource, the uncontrolled use of SMPs from any host can represent a DoS attack. This can affect subnet manager 101 operations, since the M_Key protection within the IB fabric 100 may prevent the hosts from changing any SMA state on any node. Thus, there is a need to provide SMP traffic protection in the IB fabric 100.

In accordance with an embodiment of the invention, the M_Key 102 can be created and managed by fabric administrators 110 and stored in secured memory on switches A-B 103-104 and/or HCAs 121-124. A microprocessor on a switch A-B 103-104 or a HCA 121-124 can access the memory for reading out the M_Key 102 or writing the M_Key 102 into the memory.

SMP Firewall Restrictions

In accordance with an embodiment of the invention, a secure HCA firmware can use SMP firewall restrictions to prevent host based software from hijacking either local or remote HCA ports. The SMP firewall restrictions can prevent host software from sending out SMP requests on the fabric and can reject any SMP that would otherwise be forwarded to the host software.

Figure 2:
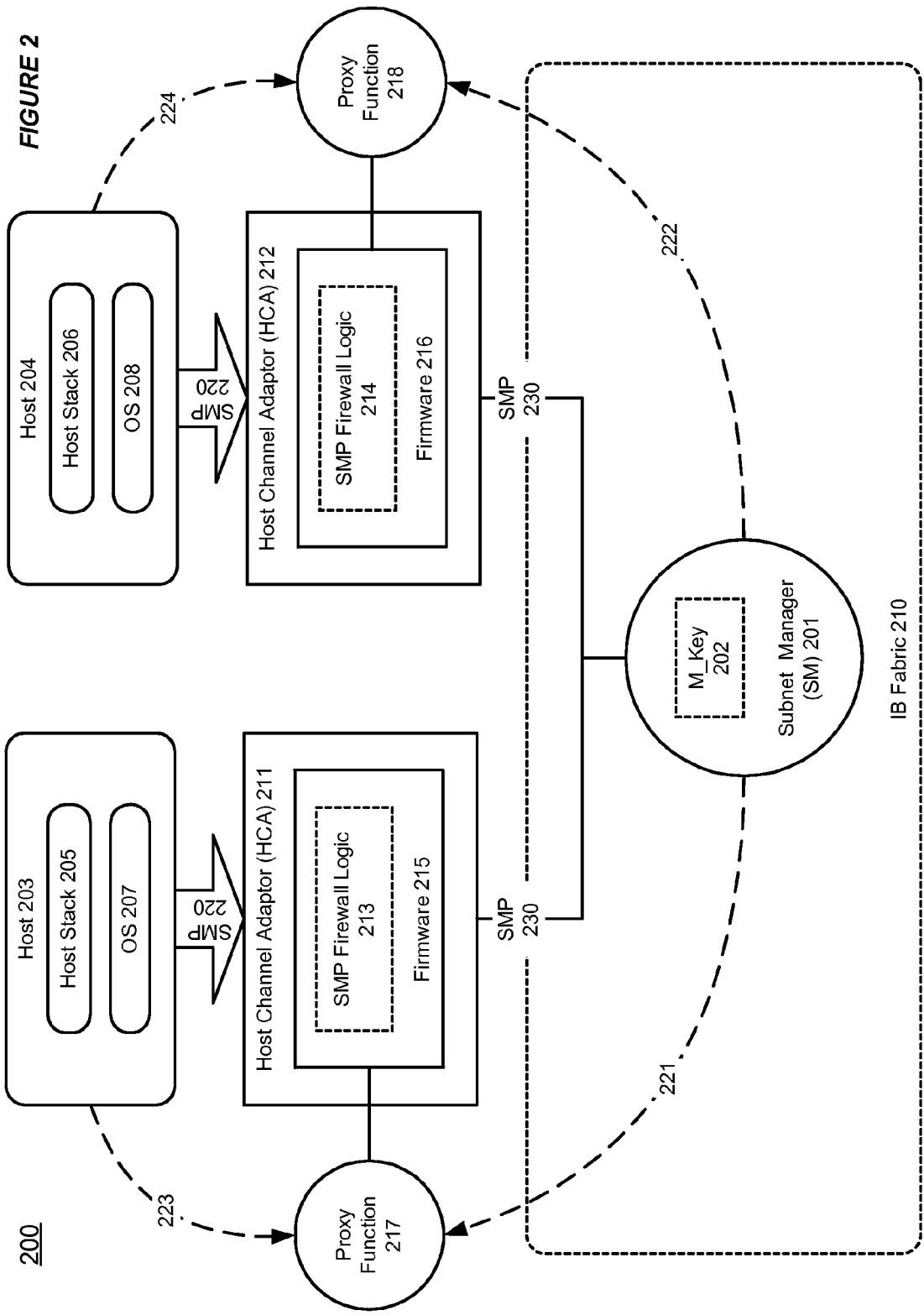
FIG. 2 shows an illustration of providing SMP firewall restrictions in a middleware machine environment, in accordance with an embodiment of the invention.

FIG. 2 shows an illustration of providing SMP firewall restrictions in a middleware machine environment, in accordance with an embodiment of the invention. As shown in FIG. 2, a middleware machine environment 200 can comprise one or more hosts 203-204 and an IB fabric 210 associated with a subnet manager 201. Each host 203-204 connects to the IB fabric 210 via a HCA 211-212, which implements a HCA firmware 215-216.

The HCA firmware 215-216 can include SMP firewall component 213-214 that can effectively prevent any SMP based denial of service (DoS) attack, e.g. targeting the operations of the subnet manager 201, and allow legal use of SMP based tools from trusted nodes in the fabric 200. The HCA SMP firewall component 213-214 can prevent the host stack software 205-206 from sending a SMP 220 onto the IB fabric 210. Furthermore, in order to prevent the information of a remote node, e.g. host 204, from being illegally provided to local host software, e.g. host software 205, the secure HCA firmware 215 can reject the SMPs 230 received from the IB fabric 210 that would otherwise be forwarded to host software 205.

Additionally, the SMP firewall component 213-214 can prevent various SMP based operations by host stack software 205-206, e.g., observing the identity of the locally connected switch ports when the subnet manager 201 is not operational. Furthermore, any SMP based communication with host stack software 205-206 from the subnet manager 201 or other legitimate components in the fabric can be prevented.

In accordance with an embodiment of the invention, the secure HCA firmware 215-216 can implement specific rules as part of the SMP firewall component 213-214, in order to ensure that legitimate operations are enabled for the host stack software 205-206. These rules allow specific SMP based request and response types to be sent and received at a tightly controlled rate. Furthermore, these rules can define source and destination restrictions for both direct route and LID route SMPs.

Additionally, these rules can allow SMP based authentication of the OS 207 and 208 or Hypervisor instance that is currently controlling the physical hosts 203 and 204 that are associated with HCA instance 211-212. Further descriptions of various embodiments of authenticating discovered components in a middleware machine platform are provided in U.S. patent application Ser. No. 13/488,040, entitled "SYSTEM AND METHOD FOR AUTHENTICATING IDENTITY OF DISCOVERED COMPONENT IN AN INFINIBAND (IB) NETWORK", filed Jun. 4, 2012, which application is herein incorporated by reference.

In accordance with an embodiment of the invention, the secure HCA firmware 215 can implement a proxy function 217-218, in order to ensure that legitimate operations are enabled for the host stack software 205-206. External management components, such as the subnet manager 201, can send vendor SMPs 221 to the host stack software 205-206 via the proxy functions 217-218. The host stack software 205-206 can communicate with the proxy functions 217-218 via local out of band interfaces 223-224 between the HCA firmware 215-216 and the host stack software 205-206. This proxy function 217-218 can then be responsible for implementing specific legal operations on behalf of the host stack software 205-206, and be responsible for communicating with the host stack software 205-206 on behalf of the remote fabric management components, e.g. the subnet manager 201.

The secure HCA firmware 215-216 can protect the IB fabric 210 from un-authorized retrieval of configuration information, e.g. preventing local host software from observing information about remote IB nodes such as globally unique identifiers (GUIDs), LIDs and partition membership that can potentially be used as a basis for DOS attacks against the remote IB node. Also, the secure HCA firmware 215-216 allows a local HCA 211-212 to adequately protect its local M_Key 202 setting from local host access, by restricting the ability to observe information about remote nodes that can be used to enable normal data communication to the remote node behind the back of the active subnet manager.

Additionally, the secure HCA firmware 215-216 may prevent the legacy SMP based diagnostics and monitoring tools from being used (or may not work) from an un-trusted host, since the secure HCA can block any SMP operations sent from an un-trusted host. Also, an M_Key scheme can be used with complete read protection, which may limit the ability of use legacy tools depending on SMPs.

Furthermore, the secure HCA firmware 215 can protect the IB fabric 200 from un-authorized SMP based communication between un-trusted hosts. The secure HCA firmware 215 can protect the IB fabric 210 from un-authorized SMP traffic that can be vulnerable to DoS attacks, e.g. targeting the SM 201 operations. Various admission control policies can restrict the SMP injection rates for different hosts 203-204 to an acceptable level. Alternatively, single subnet configurations can block all SMP operations from un-trusted hosts, e.g., utilizing the SMP block feature in the secure HCA firmware, in order to further prevent the DOS attacks.

Additionally, the secure HCA firmware 215 can protect the IB fabric 210 from DoS attacks targeting subnet administrator (SA) access. The secure HCA firmware 215 can guarantee the QoS/fairness and the scalability for accessing the SA. Also, in order to provide DoS protection, the SM 201 can be allowed to shut down HCA ports that are generating "overload" of SA requests, e.g. exceeding a request rate thresholds for certain time intervals.

Figure 3:
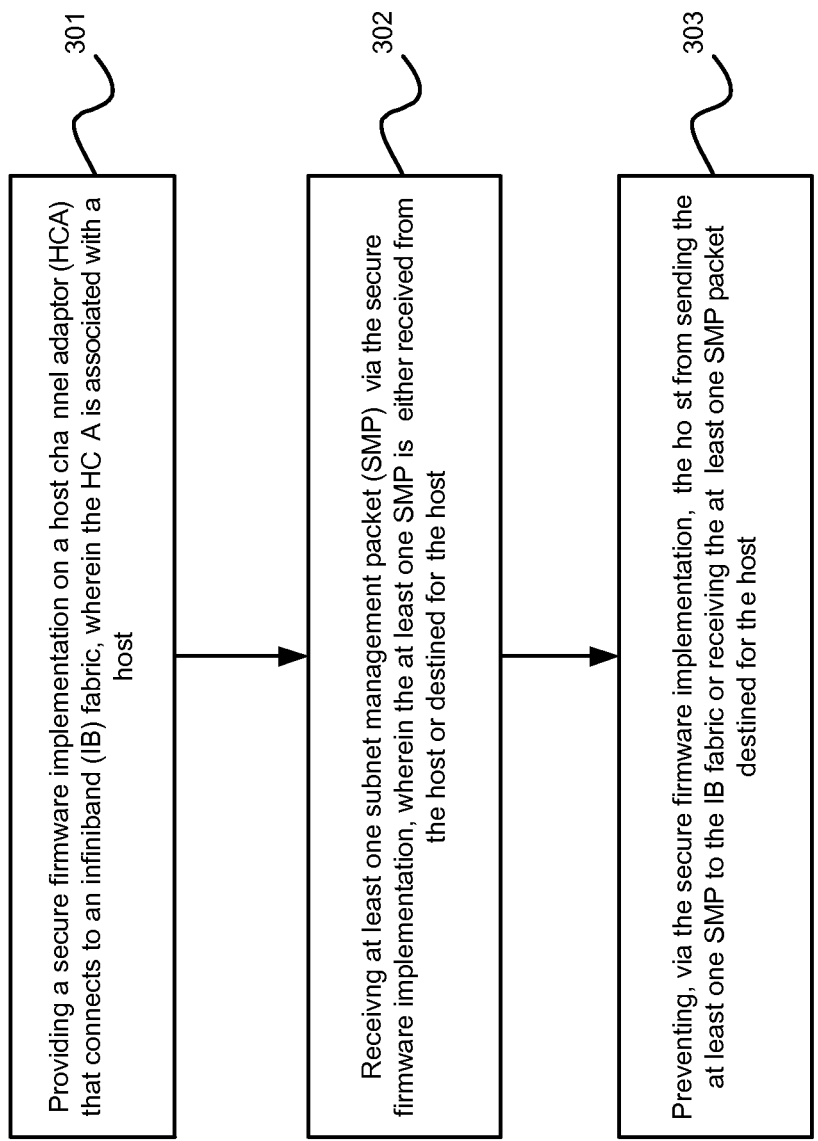
FIG. 3 illustrates an exemplary flow chart for providing SMP firewall restrictions in a middleware machine environment, in accordance with an embodiment of the invention.

FIG. 3 illustrates an exemplary flow chart for providing SMP firewall restrictions in a middleware machine environment, in accordance with an embodiment of the invention. As shown in FIG. 3, at step 301, a secure firmware implementation can be provided on a host channel adaptor (HCA) that connects to an infiniband (IB) fabric, wherein the HCA is associated with a host. Then, at step 302, the secure firmware implementation can receive at least one SMP, wherein the at least one SMP is either received from the host or destined for the host. Additionally, at step 303, the secure firmware implementation can prevent the host from sending the at least one SMP to the IB fabric or receiving the at least one SMP destined for the host.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for providing subnet management packet (SMP) firewall restrictions in a middleware machine environment operable on one or more microprocessors, comprising:
   providing a secure firmware implementation on a host channel adaptor (HCA) that connects to an infiniband (IB) fabric, wherein the HCA is associated with a host;
   receiving at least one SMP via the secure firmware implementation, wherein the at least one SMP is either received from the host or destined for the host;
   preventing, via the secure firmware implementation, the host from sending the at least one SMP to the IB fabric or receiving the at least one SMP destined for the host;
   allowing the secure firmware implementation to include a proxy function, wherein the proxy function can communicate with host software through a local out of band interface; and
   allowing a subnet manger to send SMPs to host software via the proxy function.

2. The method according to claim 1, further comprising: including SMP firewall component in the secure firmware implementation.

3. The method according to claim 2, further comprising: allowing the SMP firewall component to prevent one or more SMP based operations.

4. The method according to claim 2, further comprising: allowing the SMP firewall component to prevent SMP based communication between host software and a subnet manager.

5. The method according to claim 2, further comprising: implementing special rules as part of the SMP firewall component.

6. The method according to claim 5, further comprising: allowing the special rules to define that specific SMP based request and response types are sent and received with a tightly controlled rate, and/or define source and destination restrictions for both direct route SMPs and local identifier route SMPs.

7. The method according to claim 1, further comprising: allowing the proxy function to be responsible for implementing specific legal operations on behalf of the host software.

8. The method according to claim 1, further comprising: preventing un-authorized retrieval of configuration information from remote IB nodes.

9. A system for providing subnet management packet (SMP) firewall restrictions in a middleware machine environment operable on one or more microprocessors, comprising:
   one or more hosts, with which a host channel adaptor (HCA) is associated; and
   a secure firmware implementation on the HCA, and
   wherein the secure firmware implementation operates to
      receive at least one SMP from the host or destined to the host;
      prevent the host from sending or receiving the at least one SMP;
      include a proxy function, wherein the proxy function can communicate with host software through a local out of band interface; and
      allow a subnet manger to send SMPs to host software via the proxy function.

10. The system according to claim 9, wherein: the secure firmware implementation includes SMP firewall component.

11. The system according to claim 10, wherein: the SMP firewall component can prevent one or more SMP based operations.

12. The system according to claim 10, wherein: the SMP firewall component can prevent SMP based communication between host software and a subnet manager.

13. The system according to claim 10, further comprising: special rules that are implemented as part of the SMP firewall component.

14. The system according to claim 13, wherein: the special rules allow specific SMP based request and response types to be sent and received at a tightly controlled rate, and/or defines source and destination restrictions for both direct route SMPs and local ID route SMPs.

15. The system according to claim 9, wherein: a subnet manger operates to send SMPs to the host software via the proxy function.

16. A non-transitory machine readable storage medium having instructions stored thereon for providing subnet management packet (SMP) firewall restrictions in a middleware machine environment that when executed cause a system to perform the steps comprising:
   providing a secure firmware implementation on a host channel adaptor (HCA) that connects to an infiniband (IB) fabric, wherein the HCA is associated with a host;
   receiving at least one SMP via the secure firmware implementation, wherein the at least one SMP is either received from the host or destined for the host;
   preventing, via the secure firmware implementation, the host from sending the at least one SMP to the IB fabric or receiving the at least one SMP destined for the host;
   allowing the secure firmware implementation to include a proxy function, wherein the proxy function can communicate with host software through a local out of band interface; and
   allowing a subnet manger to send SMPs to host software via the proxy function.

* * * * *

UNITED STATES PATENT AND TRADEMARK OFFICE
CERTIFICATE OF CORRECTION

PATENT NO. : 8,739,273 B2
APPLICATION NO. : 13/545796
DATED : May 27, 2014
INVENTOR(S) : Johnsen et al.

It is certified that error appears in the above-identified patent and that said Letters Patent is hereby corrected as shown below:

In The Drawings

On sheet 1 of 3, in figure 1, under Reference Numeral 110, line 1, delete "Admistrator" and insert -- Administrator --, therefor.

On sheet 3 of 3, in figure 3, under Reference Numeral 301, line 1, delete "cha nnel" and insert -- channel --, therefor.

On sheet 3 of 3, in figure 3, under Reference Numeral 301, line 2, delete "HC A" and insert -- HCA --, therefor.

On sheet 3 of 3, in figure 3, under Reference Numeral 302, line 1, delete "Receivng" and insert -- Receiving --, therefor.

On sheet 3 of 3, in figure 3, under Reference Numeral 303, line 1, delete "ho st" and insert -- host --, therefor.

Signed and Sealed this
Twenty-seventh Day of January, 2015

Michelle K. Lee
*Deputy Director of the United States Patent and Trademark Office*